Sept. 12, 1933.  W. W. CLARKE ET AL  1,926,195
CALCULATING CHEESE CUTTER
Filed Jan. 13, 1932  3 Sheets-Sheet 1
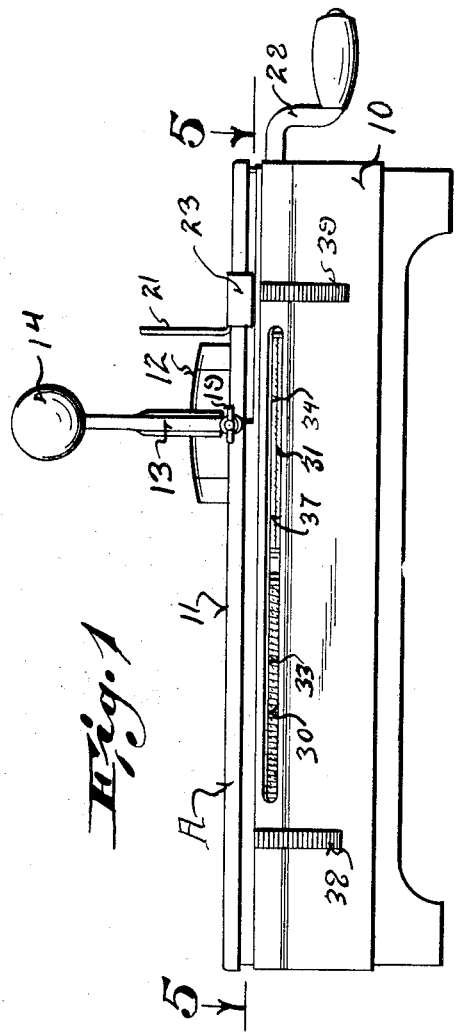
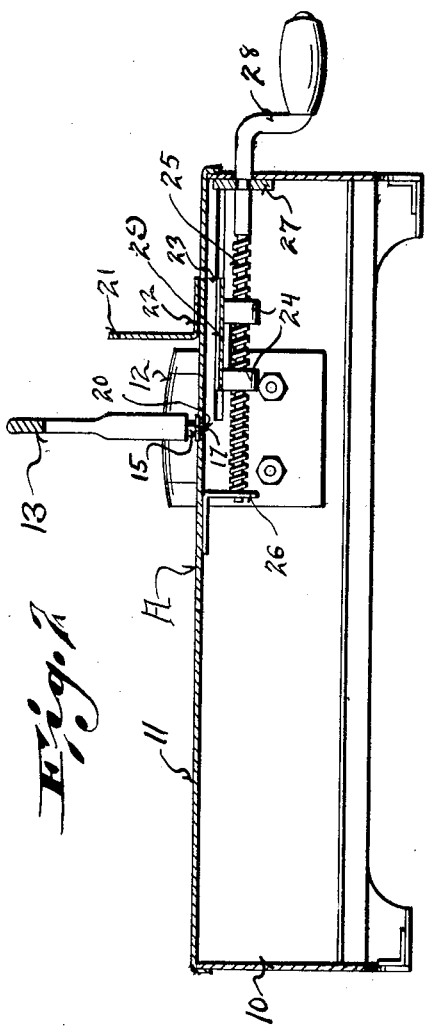
Inventors
W.W. Clarke
J.J. Borusky
By
Attorneys Sept. 12, 1933.  W. W. CLARKE ET AL  1,926,195
CALCULATING CHEESE CUTTER
Filed Jan. 13, 1932  3 Sheets-Sheet 2
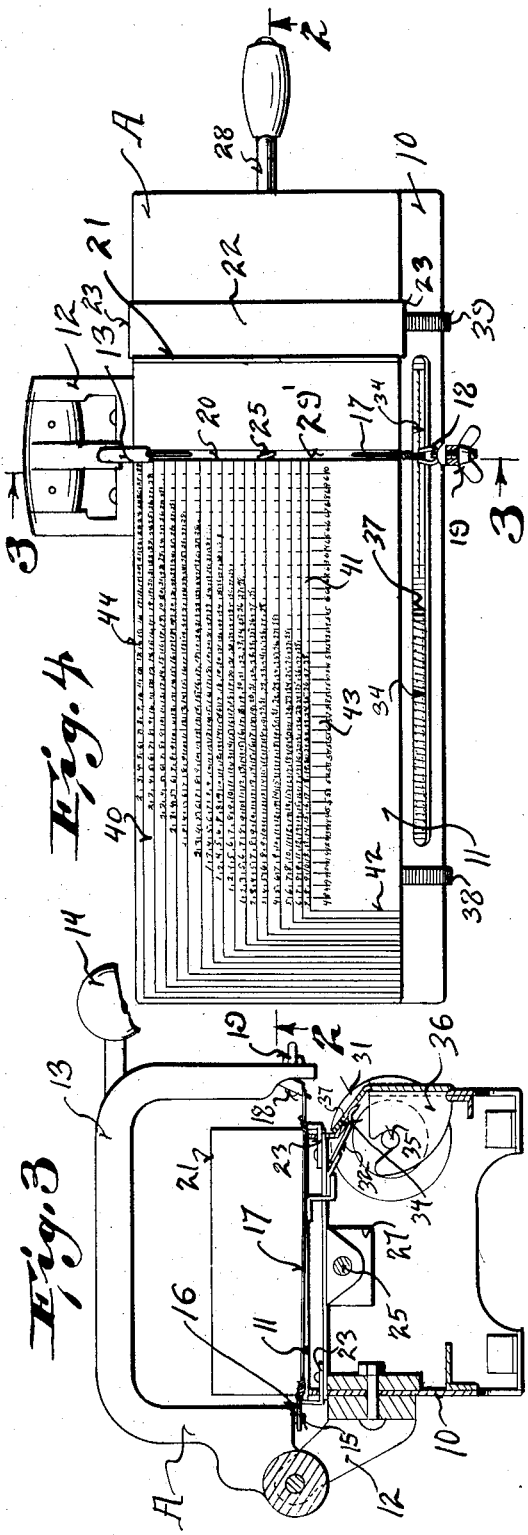
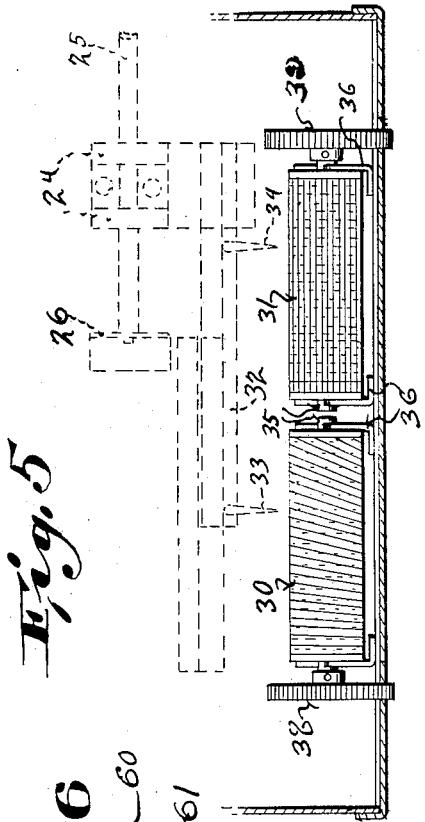
Inventors
W.W. Clarke
J.J. Borvsky
By [signature]
Attorneys

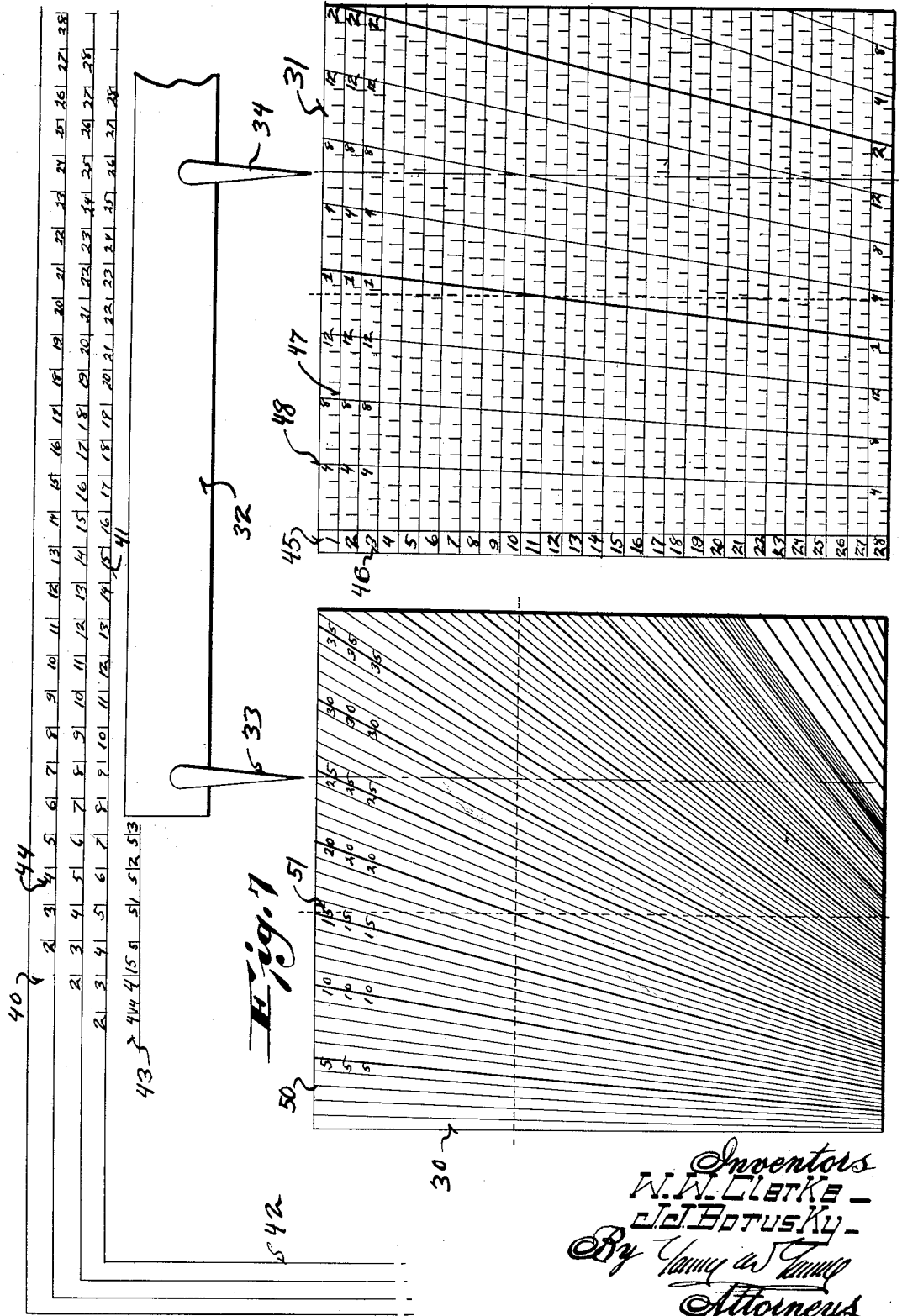

Patented Sept. 12, 1933

1,926,195

UNITED STATES PATENT OFFICE 1,926,195

CALCULATING CHEESE CUTTER

Walter W. Clarke and Joseph J. Borusky, Two Rivers, Wis.

Application January 13, 1932. Serial No. 586,368

3 Claims. (Cl. 235—61)

This invention relates to a novel device for dispensing loaf cheeses, and more particularly to a cheese measuring and cutting device for use in retail stores.

It is now common practice to distribute cheese to retail stores in a loaf or brick form. The usual method of cutting cheese by guess, and then weighing the same, results not only in a loss of time, but also in the likelihood of dispensing the cut cheese to the customer either slightly over or under weight. Various cheese cutting and calculating devices have been suggested, but as the cheeses in the different bricks or loaves vary as to weight and length, accurate cutting of the desired slices has not been possible.

It is, therefore, one of the primary objects of our invention to provide a novel device and method for accurately cutting the cheese in the desired amount required by the customer, irrespective of any variations which might occur in the weight or length of the cheese loaf or brick.

Another important object of our invention is the provision of a novel scale or computing device in connection with the cutting machine and a novel method for using the scale or computing device, whereby the cheese can be placed at the exact required distance relative to the cutting knife or wire for severing the correct amount of cheese from the loaf or brick.

A further salient object of our invention is the provision of a cheese cutting and calculating device, embodying a base plate for receiving the cheese brick which is to be dispensed, having a swinging cutting knife mounted on the base plate for cutting the brick, with a guide plate movably mounted on the base plate toward and away from the cutting knife for accurately gauging the required amount to be cut from the cheese, a rotatable value gauge bearing different scales for cheeses of different weights and lengths being arranged longitudinally of and at one side of the base plate, with a pointer carried by the guide plate movable over the value gauge, means being provided for acting in conjunction with the value gauge for determining the exact scale to be employed on the value gauge according to the weight and length of the cheese.

A further object of our invention is the provision of means whereby a cheese having once been identified as to weight and length, for determining the particular scale to be used on the value gauge, the necessity for reweighing and measuring the cheese is eliminated, said means including an indicating button for attachment to the cheese indicating the scale to be followed in the cutting thereof.

A still further object of our invention is the provision of novel means for mounting the guide plate on the base plate or bed, with novel means for synchronously operating the guide plate and indicating pointer relative to the cutting knife or wire and the value gauge.

A still further object of our invention is to provide an improved cheese cutter and calculating machine of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which:

Figure 1 is a front side elevation of our improved cheese cutting and calculating machine;

Figure 2 is a longitudinal section through the same taken on the line 2—2 of Figure 4, looking in the direction of the arrows;

Figure 3 is a transverse section through the improved device taken on the line 3—3 of Figure 4, looking in the direction of the swinging knife or wire for severing the desired amounts of cheese;

Figure 4 is a top plan view of the improved cheese cutting calculating device;

Figure 5 is a horizontal section taken on the line 5—5 of Figure 1, looking in the direction of the arrows, illustrating the rotatable value gauge rollers carried thereby;

Figure 6 is a detailed perspective view of one of the indicating devices for association with a brick of cheese to identify the particular scale which is to be used for cutting the same; and, Figure 7 is a diagrammatic view of the measuring scale and value gauge rollers illustrating the use thereof.

Referring to the drawings in detail, wherein similar reference characters designate corresponding parts throughout the several views, the letter A generally indicates our improved cheese cutting and calculating device, which comprises a base 10. This base 10 may be constructed in any preferred way and out of any desired materials, suitably ornamented, so as to present a pleasing and attractive appearance to the eye. This base 10 is preferably in the nature of a casing so that the same can be employed for housing the various operating parts of the device. As shown, the base includes a top base plate or bed 11 on which the loaf or brick of cheese to be cut is placed. Rigidly secured to one side of the base adjacent to one end thereof, is a supporting bracket 12 to which is pivotally connected the swinging cheese cutting knife or wire 13. This cheese cutting knife 13 is in the form of an inverted U-shaped frame and is provided with a manipulating handle 14. One lower corner of the swinging frame 13 is provided with a depending stud 15, which receives the looped end 16 of a wire cutter 17. The opposite end of the wire cutter is looped and placed over an adjustable finger 18. This finger is adjusted by the use of a bolt and winged nut 19, whereby the tension of the wire cutter 17 can be varied. Directly below the cutter, the base plate 11 is provided with a transverse slot or recess 29', whereby the cutter wire 17 can extend into the plate for completely severing the quantity of cheese to be cut from the loaf or brick.

Slidably mounted on the top face of the base or bed plate 11 is a movable guide or abutment plate 21. The abutment plate 21 extends transversely across the bed and is provided with a horizontally disposed guide flange 22 having the curved guide fingers 23 on its opposite ends for slidably engaging the longitudinal side edges of the bed plate. This permits the free sliding of the abutment plate without canting or binding thereof on the bed plate.

Means is provided for accurately varying the distance of the abutment plate from the cutting knife, so that quantities of cheese of different sizes can be cut from the cheese loaf or brick. This adjusting means includes feed nuts 24 which are mounted on a feed screw 25. This feed screw 25 is rotatably mounted at the longitudinal center of the base and is rotatably mounted in position against longitudinal movement by the use of suitable bearings 26 and 27 carried by said base.

One end of the feed screw is extended beyond the base and carries a crank handle 28, whereby the feed screw can be readily rotated. By referring to Figure 2 of the drawings, it can be seen that the end guide flanges 23 of the abutment plate 21 are connected by a transverse bridge piece 29 and the feed nuts 24 are rigidly connected to said bridge.

In connection with the cutting of a desired slice or quantity of cheese, we utilize novel value gauges 30 and 31. Connected with the bridge plate 29 is the forwardly extending arm 32, which carries indicating pointers 33 and 34 for cooperating respectively with the value gauges 30 and 31.

These value gauges 30 and 31 can be in the form of rollers, as shown, and these rollers are so mounted within the base that the same can be removed, so that other rollers carrying different scales can be utilized with our machine. If preferred, the scales which will be hereinafter more fully described can be printed on sheets of flexible paper or the like, and detachably secured to the peripheries of the rollers. The value gauge 30 is utilized for cutting cheese according to the money value thereof, while the value gauge 31 is utilized for cutting cheese according to the weight desired irrespective of the selling price of the cheese per pound.

Each of the value gauges 30 and 31 are provided at their opposite terminals and at the axial centers thereof, with bearing pins 35, which are removably seated within bearing brackets 36 carried by the base. The base is provided with a sight slot 37, so that the value gauges 30 and 31 and their indicating pointers 33 and 34 can be seen from the exterior of the base. Turning knobs 38 and 39 are provided respectively for the value gauges 30 and 31 and a portion of the peripheries of these knobs extend through the base, so that the same can be readily engaged by the fingers of an operator for permitting the correct setting thereof.

In conjunction with the value gauges 30 and 31, we employ a scale 40 for determining the exact computing scale to be used on the roller or value gauge 31 according to the weight and length of a cheese being cut. This scale 40, as shown, can be placed directly on the base or bed plate 11 of the cutting machine and obviously, this position of the scale is a convenient one.

The scale 40 embodies spaced longitudinal lines 41 and connecting transverse guide lines 42. Extending longitudinally along the longitudinal lines 41 is a scale 43 calibrated to indicate different weights of cheese. The various longitudinal lines 41 are each calibrated and are marked with indicating numbers 44 to give the particular computing scale to be used on the value gauge 31. All of the calibrations read from the slot 20 of the base or bed plate.

Referring to the value gauge 31 and more particularly to Figure 7 of the drawings, it will be noted that one edge of the computing gauge is divided into blocks 45 in which are placed indicating numbers 46 which correspond to the indicating numbers 44 of the scale 40 on the base plate. Longitudinally equally distantly spaced lines 47 are marked on the value gauge and lead from the blocks 45, so as to facilitate the reading of the value gauge and the gauge has marked thereon around the peripheries thereof, spaced lines 48 suitably marked by numbers to indicate ounces and pounds.

As stated, the value gauge 30 is utilized when the prospective purchasers are buying the cheese according to a money value, that is, the gauge 30 is utilized where persons ask for 5, 10 or 15¢ worth of cheese, etc. Thus, the gauge 30 is divided by predetermined disposed lines 50 marked by numbers 51 to indicate a money value.

In use of our improved apparatus, the cheese to be cut is initially placed on a scale so that its gross weight may be ascertained, and this weight is noted by the store clerk.

The cheese is now placed on the bed plate 11 with its forward end in alignment with the slot 20. The position of the rear end of the cheese relative to a transverse line 42 is noted and this transverse line is then followed to its companion longitudinal line 41 to the place marked according to the exact weight of the cheese. Thus, for instance, if the cheese weighs five pounds and twelve ounces and the rear end of the cheese terminates at the fourth transverse line from the rear end of the bed plate, the indicating number 16 must be followed on the value gauge 31. Suitable indicating buttons or the like 60 are provided and these buttons carry the various indicating scale numbers and when the scale number is found, for a particular brick of cheese, this number is secured to the left end of the cheese. This eliminates the necessity of weighing and measuring the cheese previously gauged each time the same is cut, it being obvious that after a cheese has been cut, that the same is removed from the device and placed back into the refrigerator. In order to facilitate the application of the indicating buttons to the different cheeses, each of the buttons can be provided with a penetrating prong 61.

If a person desires to buy, say one and one-half pounds of cheese, and the cheese has been previously weighed and measured to determine the scale to be followed, the value gauge 31 is turned to exhibit the required scale to view through the sight opening 37. Thus, if the cheese bears the indicating number 16, the value gauge 31 is turned until the indicating number 16 is brought to view.

The handle 28 for the abutment plate 21 is turned until the indicating pointer 34 coincides with the amount of cheese required in the scale 16. Thus, the pointer 34 is moved until the same registers with the mark one pound-eight ounces in the scale 16. The knife is now raised and the cheese to be cut is placed against the abutment plate 21 and the piece of cheese arranged between the slot 20 and the plate 21 is the piece which is to be sold and cut. The knife is now swung downward and the wire 17 will completely sever this piece from the cheese brick. From the foregoing, it can be seen that where a cheese has been weighed and measured and the indicating number is, say 10, as shown in Figure 7 of the drawings, the value roller 31 is turned until the indicating number 10 appears and if a one and one-half pound piece of cheese is to be purchased, the handle 28 is turned until the pointer 34 coincides with the number indicating line for one pound-eight ounces in the scale indicated by the indicating number 10.

It is to be noted that the peripheral lines 48 all incline gradually toward the highest indicating number on the value gauge and thus a smaller slice of cheese is cut when one of the scales is used bearing a higher indicating number than when one of the scales is used bearing a low indicating number.

When a person desires to buy a cheese not by weight, but buys a piece having a certain money value, the value gauge 30 is used in connection with the value gauge 31.

It often happens that persons will enter a store and ask for 10, 15 or 20¢ worth of cheese and thus the value gauge 30 is employed for this purpose. By referring more particularly to the value gauge 30, it will be noted that all of the indicating lines 50 converge toward one longitudinal edge or line on the value roller and the converging of these lines give the varying thickness of the slices of cheese to be cut according to the weight and length of the cheese.

Thus, if a customer enters a store and desires to buy, say 5¢ worth of cheese, the handle 28 is rotated until pointer 34 coincides with the line indicating one pound on the scale 31. If the cheese being cut bears the indicating number 10, the value gauge 31 is turned until the scale 10 can be seen through the sight slot 37 and pointer 34 is made to coincide with the pound mark in the scale 10. If the particular kind of cheese desired by the customer sells, say at 20¢ per pound, the value gauge 30 is rotated until the line indicated by the numeral 20 thereon coincides with the indicating pointer 33. This will give the longitudinal line on the value roller 31 which is to be used and the handle 28 is again turned until the pointer 33 coincides with the 5¢ mark on the said value roller.

The cheese is now placed against the abutment plate 21 and the knife is swung downward which will sever a slice of the desired thickness from the cheese.

Changes in details may be made without departing from the spirit or the scope of this invention, but what we claim as new is:

1. In a cheese dispensing device a bed plate upon which the cheese is received, a scale on said bed plate comprising longitudinal lines arranged in spaced parallel relation, spaced parallel transverse lines at one end of the bed plate connected with the longitudinal lines and located at different distances from a given point on said bed plate, the longitudinal lines being calibrated and provided with predetermined indicating numbers, a second scale on the bed plate graduated into pounds and ounces corresponding to the given weight of a cheese brick, and a movable value gauge disposed longitudinally of the bed plate having indicating numbers corresponding to the indicating numbers on the longitudinal lines.

2. In a cheese cutter, the combination of a support for the cheese, an indicating device bearing indicating numbers for determining the correct indicating number to be used with a cheese brick of a certain weight and length, a value gauge mounted upon the body longitudinally of the brick cheese to be cut, said value gauge embodying a plurality of different value scales graduated into pounds and ounces according to a brick cheese of predetermined weight and length, each of the value scales having an indicating number corresponding with the indicating numbers on the first mentioned scale, the value gauge being rotatably mounted, whereby the desired value scale can be brought into use, and means for measuring the piece of cheese to be cut from brick of predetermined length and weight on the value scale.

3. A cheese cutter for dispensing slices of cheese from cheese bricks according to weight and money value, the combination of a base, an abutment plate slidable on the base movable toward and away from a given point, a computing device on the base including a plurality of longitudinally extending lines calibrated and provided with indicating numbers, spaced parallel transverse lines connected with the longitudinal lines and disposed different distances from the mentioned given point, a scale on the base disposed adjacent to the longitudinal lines divided into pounds and ounces, a value gauge for indicating weight rotatably mounted on the base and arranged longitudinally thereof including a plurality of independent value scales graduated according to pounds and fractions thereof, each of said value scales bearing an indicating number corresponding to the indicating numbers on the longitudinal lines, a second value gauge calibrated to read according to the money value of the cheese, means for adjusting the abutment plate, and cooperating pointers movable with the abutment plate for traveling movement over the value gauges.

WALTER W. CLARKE.
JOSEPH J. BORUSKY.